United States Patent [19]

Higuchi et al.

[11] 4,007,314

[45] Feb. 8, 1977

[54] MAGNETIC RECORDING MEDIUM WITH SILANE LUBRICANT

[75] Inventors: Shigetaka Higuchi; Yoshiaki Hisagen, both of Sendai; Minoru Takamizawa; Masatoshi Takita, both of Annaka, all of Japan

[73] Assignees: Sony Corporation; Shinetsu Chemical Co., Ltd., both of Tokyo, Japan

[22] Filed: Oct. 1, 1975

[21] Appl. No.: 618,367

[30] Foreign Application Priority Data

Oct. 2, 1974 Japan ............... 49-114390

[52] U.S. Cl. .................. 428/447; 428/900; 428/539; 427/128; 427/131; 252/62.51; 252/62.56; 252/49.6

[51] Int. Cl.² ........................... B32B 9/04

[58] Field of Search .......... 428/900, 446, 447, 449, 428/451, 539; 252/62.51, 62.54, 62.56, 49.6; 427/127, 128, 131

[56] References Cited

UNITED STATES PATENTS

| | | | |
|---|---|---|---|
| 3,144,352 | 8/1964 | Talley | 428/900 X |
| 3,404,997 | 10/1968 | Jacobson | 252/62.54 |
| 3,527,659 | 9/1970 | Keil | 428/447 |

*Primary Examiner*—Ralph S. Kendall
*Assistant Examiner*—Charles R. Wolfe, Jr.
*Attorney, Agent, or Firm*—Hill, Gross, Simpson, Van Santen, Steadman, Chiara & Simpson

[57] ABSTRACT

A magnetic recording medium including a flexible non-magnetic film base and a magnetic layer thereon consisting of magnetizable particles in a resinous binder, the magnetic layer containing or being coated with an organosilicon lubricant compound having the formula:

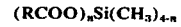

$$(RCOO)_n Si(CH_3)_{4-n}$$

where R is a saturated or unsaturated aliphatic group containing from 7 to 17 carbon atoms and n is an integer in the range from 1 to 3. The friction coefficient and the tendency of the powder to come off from the magnetic layer of the magnetic recording medium are reduced.

7 Claims, 1 Drawing Figure

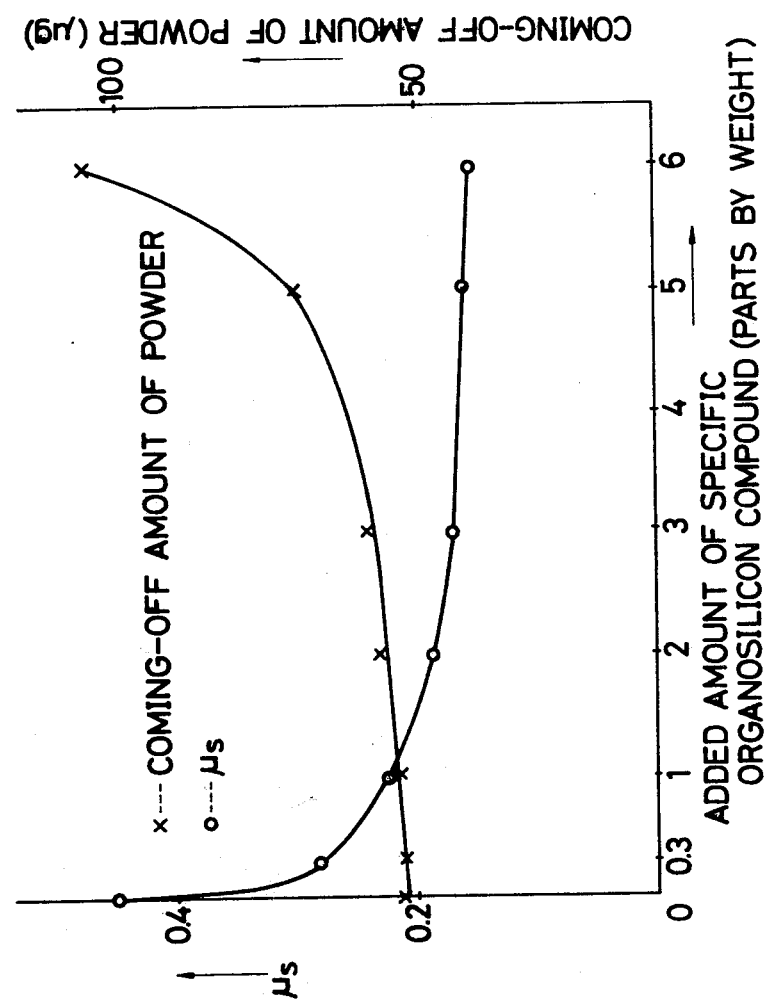

MAGNETIC RECORDING MEDIUM WITH SILANE LUBRICANT

BACKGROUND OF THE INVENTION

1. Field of the Invention

The invention relates to a magnetic recording medium having a flexible non-magnetic film base and a magnetic layer thereon comprising magnetizable particles dispersed in a binder, the magnetic layer containing or being coated with a lubricant consisting of an organosilicon ester.

2. Description of the Prior Art

A magnetic recording medium whether used for audio recording, video recording, or other magnetic recording purposes comes in contact with tape guide members, magnetic heads and the like during use. In the case of a video tape recorder, where high tape velocities are encountered, the tape must have a sufficient wear resistance and a relatively small friction coefficient if it is to run smoothly and steadily for a long time. Magnetic recording tape which has an increased friction coefficient vibrates at the tape guide members and at the magnetic heads during the recording operation or the reproducing operation, so that the recorded signals or the reproduced signals are distorted from the originals. In some cases, a so-called "Q" sound due to vibration of the magnetic recording tape is encountered.

Efforts have been made to overcome the above-described defects and to impart lubricity or smoothness to the magnetic recording tape, but no completely satisfactory lubricant for magnetic recording tapes has yet been obtained. For example, it has been suggested to use lubricants such as a silicone fluid, castor oil, molybdenum disulfide, graphite, higher fatty acids or the like, the lubricant being mixed into a magnetic layer containing a magnetic powder such as gamma ferric oxide and a binder such as polyvinyl chloride. Magnetic recording tapes containing such lubricants exhibit some wear resistance, but not to a sufficient degree. When a large quantity of the lubricant is mixed into the magnetic layer in order to further increase the wear resistance, a so-called "blooming" occurs on the magnetic layer. The blooming results from the lubricating agent exuding on the surface of the magnetic layer and becoming separated therefrom. As a result, the surface of the magnetic recording tape gets rough, and more powder comes off from the magnetic recording layer.

SUMMARY OF THE INVENTION

The present invention provides a magnetic recording medium which has a flexible non-magnetic film base and a magnetic layer thereon comprising magnetizable particles dispersed in a resinous binder, the magnetic layer containing or being coated with an organosilicon ester having the formula:

$$(RCOO)_nSi(CH_3)_{4-n}$$

where R is a saturated or unsaturated aliphatic group, usually a straight chained aliphatic group having from 7 to 17 carbon atoms, and $n$ is an integer in the range from 1 to 3.

BRIEF DESCRIPTION OF THE DRAWING

The single drawing accompanying this application is a graph showing the relationship between added amounts of the organosilicon ester and the effect on static friction coefficient and the coming-off amount of powder.

DESCRIPTION OF THE PREFERRED EMBODIMENTS

The magnetic recording tape of the present invention has superior wear resistance. Its friction coefficient is reduced and the lubricity or smoothness are improved. Accordingly, the magnetic recording tape of the present invention can run smoothly and steadily for a long time.

The organosilicon compound according to the present invention is a fatty acid ester silane having a chemical bond uniting an aliphatic acidic group to a silicon atom, and having a molecular structure which is difficult to crystallize. Accordingly, the melting point of the organosilicon compound is generally low. It has been found that the magnetic recording tape can be improved to reduce blooming and the coming-off of powder by adding such an organosilicon compound into the magnetic layer thereof, and/or by coating the magnetic layer with such an organosilicon compound. Moreover, the surface energy of the magnetic layer is reduced and thereby the smoothness or lubricity of the magnetic recording tape is improved.

It has been found that the number of carbon atoms in the aliphatic group R should be in the range from 7 to 17 since when the number of carbon atoms is less than 7, the friction coefficient of the magnetic recording tape is too large and that blooming occurs and the coming-off of powder of the magnetic layer is increased when the number of carbon atoms is more than 17.

Preferably, from 0.3 to 5 parts by weight of the organosilicon compound are added to 100 parts by weight of the magnetic powder, for example, a gamma ferric oxide. When more than 5 parts of the organosilicon compound are added to the magnetic powder, the strength of the magnetic layer is reduced and the coming-off of powder is increased, although the friction coefficient is reduced. When less than 0.3 parts of the organosilicon compound are added to the magnetic layer, the organosilicon compound does not provide a sufficient lubricity to the magnetic recording tape and the friction coefficient is not sufficiently reduced.

Any conventional ferromagnetic magnetizable powder such as gamma ferric oxide, magnetite, chromium dioxide or iron-cobalt alloys can be used. The binder can be any of the conventionally used binders employed in magnetic rocording tapes such as a vinyl chloride-vinylacetate copolymer resin in combination with a polyurethane resin. The magnetic layer may also include a conventional antistatic agent such as carbon, and a dispersant such as lecithin.

The organosilicon ester of the present invention can be made in a variety of processes. In one, a chlorosilane is reacted with a fatty acid in the presence of a dehydrochlorination agent such as an amine according to the following equation:

$$(CH_3)_2SiCl_2 + 2RCOOH + 2N(C_2H_5)_3 \rightarrow (RCOO)_2Si(CH_3)_2 + 2(C_2H_5)_3N \cdot HCl$$

This reaction produces the organosilicon compound of the purpose at a high yield.

Another method for synthesizing the organosilicon compound involves reacting an alkoxyl silane such as $(CH_3)_2Si(OR')_2$, where $R'$ represents an alkyl group such as a methyl group or an ethyl group with a fatty acid in the presence of an acidic or basic catalyst according to the following equation:

$$(CH_3)_2Si(OR')_2 + 2RCOOH \rightarrow (CH_3)_2Si(OCOR)_2 + 2R'OH$$

There is a tendency of the organosilicon compound to be hydrolyzed by water. However, the organosilicon compound is sufficiently stable in the absence of strong acid or base. When the number of carbon atoms in the fatty acid group is more than 6, the organosilicon compound is more stable. It has been found that the magnetic recording tape prepared according to the invention is sufficiently stable against the water under normal use conditions.

The following specific examples are given to illustrate the invention. In the examples parts are all parts by weight.

EXAMPLE 1

| | |
|---|---|
| Ferromagnetic ferric oxide (gamma $Fe_2O_3$) powder | 100 parts |
| "VAGH" vinylchloride-vinylacetate copolymer resin (Union Carbide) | 20 parts |
| "Nipporan-3022" polyurethane resin (Nippon Polyurethane Co.) | 10 parts |
| Carbon black | 0.5 parts |
| Lecithin | 1.0 part |

Two parts of each of the organosilicon compounds set forth in and Table 1 were added into the above-described magnetic composition. Samples Nos. 1 to 5 represent instances where R had 7, 9, 13, 17 and 17 carbon atoms in number, respectively, in each case $n$ was equal to 2. The organosilicon compound of sample No. 5 has an unsaturated aliphatic group. Samples Nos. 6, 7 and 8 in Table 1 are provided for comparison with samples Nos. 1 to 5 according to the present invention. In samples Nos. 6, 7 and 8, R had 21, 18 and 6 carbon atoms in number, respectively, and $n$ was equal to 2 in each instance. In Table 1, sample No. 9 which was a methylphenylsilicone fluid which is an example of a conventional lubricant.

The magnetic mixture containing the organosilicon compound was mixed with stirring with 300 parts of a solvent mixture of equal parts by weight of methylethylketone and methylisobutylketone in a ball mill for 24 hours. The resulting mixtures were applied at a thickness of 10 microns onto polyethylene terephthalate films to form magnetic recording tapes. The tapes were tested for static friction coefficient, the amount of coming-off of powder and the "Q" sound. The results of these tests are also shown in Table 1, where methylphenylsilicone oil was used as the reference (Sample No. 9) of which trade mark is KF-54 (manufactured by Shin-Etsu Chem. Co., Ltd. in Japan), having $400 \pm 50$ cS of the viscosity at 25° C and from 1.06 to 1.08 of the specific gravity.

TABLE 1

| Sample No. | Organosilicon compound | Static friction coefficient, $\mu_s$ | Coming-off of powder, micrograms | Q sound |
|---|---|---|---|---|
| 1 | $(C_7H_{15}COO)_2Si(CH_3)_2$ | 0.205 | 63 | none |
| 2 | $(C_9H_{19}COO)_2Si(CH_3)_2$ | 0.194 | 60 | none |
| 3 | $(C_{13}H_{27}COO)_2Si(CH_3)_2$ | 0.185 | 56 | none |
| 4 | $(C_{17}H_{35}COO)_2Si(CH_3)_2$ | 0.230 | 70 | none |
| 5 | $(C_{17}H_{33}COO)_2Si(CH_3)_2$ | 0.250 | 55 | none |
| 6 | $(C_{21}H_{43}COO)_2Si(CH_3)_2$ | 0.265 | 110 | slight |
| 7 | $(C_{18}H_{37}COO)_2Si(CH_3)_2$ | 0.260 | 100 | slight |
| 8 | $(C_6H_{13}COO)_2Si(CH_3)_2$ | 0.350 | 60 | considerable |
| 9 | Methylphenylsilicone fluid (viscosity $400 \pm 50$ cS at 25° C, specific gravity 1.06 to 1.08) | 0.443 | 340 | considerable |

The static friction coefficient was determined in the following manner. The sample magnetic recording tape was placed with its magnetic surface engaging one quarter of the periphery of a brass cylinder. A constant tension was applied to the sample and the tension was measured at the moment the sample started to slip.

The static friction coefficient ($\mu_s$) was calculated from the following equation:

$$\mu_s = \frac{2}{\pi} \ln \frac{T_2}{T_1}$$

where $T_2$ was the measured tension at the moment the sample started slipping, and $T_1$ was the originally applied tension.

The amount of powder coming off was determined by the difference in weight between an abraded sample and a non-abraded sample.

As is apparent from Table 1, the static friction coefficient of the conventional silicone fluid was considerably larger, the Q sound was considerably greater, and the amount of powder coming off was very large. On the other hand, the static friction coefficients of the improved tapes were very small, the Q sound was absent, and the coming-off of powder was very small. The magnetic recording tapes of samples Nos. 1 to 5 ran smoothly and steadily. The wear resistance was greatly improved. In each of samples Nos. 6 and 7 where the number of carbon atoms in the aliphatic group R was more than 17, blooming occurred and the amount of powder coming off was large, although the static friction coefficient was very small. In the case of sample No. 8, where the number of carbon atoms in the group R was less than 7, the static friction coefficient was relatively large, and there was considerable "Q" sound.

EXAMPLE 2

Three additional samples (Nos. 10, 11 and 12) of magnetic tapes were made with organosilicon compounds as shown in Table 2. In sample No. 10, R had 13 carbon atoms, and $n$ was equal to 3. Samples Nos. 11 and 12 were instances where R was 13 and 17, respectively, and $n$ was 1. The magnetic recording tapes of samples Nos. 10 to 12 were produced in the same manner as in Example 1 and similarly tested. Test results are shown in Table 2, and these results were satisfactory in all respects.

TABLE 2

| Sample | Organosilicon compound | Static friction coefficient, $\mu_s$ | Coming-off of powder, micrograms | Q sound |
|---|---|---|---|---|
| 10 | $(C_{13}H_{27}COO)_3SiCH_3$ | 0.265 | 50 | none |
| 11 | $(C_{13}H_{27}COO)Si(CH_3)_3$ | 0.270 | 65 | none |
| 12 | $(C_{17}H_{35}COO)Si(CH_3)_3$ | 0.282 | 55 | none |

EXAMPLE 3

The amount of organosilicon compound used in sample No. 3 was varied within the range of 0 to 6 parts, to form different magnetic recording tapes. The static friction coefficient and the coming-off amount of powder were tested. The results are shown in the drawing.

As apparent from the drawing, both static friction coefficient $\mu_s$ and the coming-off amount of powder were satisfactorily small at the added amounts, 0.3, 1, 2, 3 and 5 parts, and particularly in the range of from 0.5 to 2.5 parts. There was no Q sound produced. The amount of powder coming off rapidly increased as the amount added amounted to more than 5 parts. When the added amount was less than 0.3 parts, the static friction coefficient was very large.

EXAMPLE 4

Four polyethylene terephthalate films were coated with the magnetic composition of Example 1 but without addition of the organosilicon compounds to form magnetic layers. Then, the magnetic layers were coated with isopropyl alcohol solutions each containing 1% of any one of the organosilicon compounds shown in Table 3 following to produce samples Nos. 13 to 15, respectively. The results of these tests are shown in Table 3 following, where methylphenylsilicone fluid was used as the reference (Sample No. 16) of which trade mark is KF-54 (manufactured by Shin-Etsu Chem. Co., Ltd. in Japan), having 400 ± 50 cS of the viscosity at 25° C and from 1.06 to 1.08 of the specific gravity.

tion.

From the foregoing, it will be evident that the improved magnetic tape of the present invention has increased wear resistance, a reduced blooming tendency, and is resistant to powder loss. Since the organosilicon compound used in the present invention imparts sufficient lubricity to the magnetic layer, the friction coefficient is greatly reduced and the generation of "Q" sounds is prevented so that the magnetic tape runs steadily.

We claim as our invention:

1. In a magnetic recording medium having a non-magnetic base and a magnetic layer formed thereon containing magnetizable particles dispersed in a resinous binder, the improvement comprising said magnetic layer having an organosilicon compound represented by the formula $$(RCOO)_n Si(CH_3)_{4-n}$$

where R is an aliphatic group containing from 7 to 17 carbon atoms and $n$ is an integer from 1 to 3, said compound being present in an amount of from 0.3 to 5 parts by weight for every 100 parts by weight of said magnetizable particles.

2. A magnetic recording medium according to claim 1, wherein said organosilicon compound is contained in said magnetic layer.

3. A magnetic recording medium according to claim 1, wherein said organosilicon compound is coated on the surface of said magnetic layer.

4. A magnetic recording medium according to claim 1, which further includes an antistatic agent and a dispersing agent.

5. A magnetic recording medium according to claim 1, wherein said magnetic layer includes two or more of said organosilicon compounds in combination, each represented by the formula set forth in claim 1.

6. A magnetic recording medium according to claim 1, wherein said aliphatic group is a saturated aliphatic group.

7. A magnetic recording medium according to claim 1, wherein said aliphatic group is an unsaturated aliphatic group.

TABLE 3

| Sample No. | Organosilicon compound | Static friction coefficient, $\mu_s$ | Coming-off of powder, micrograms | Q sound |
|---|---|---|---|---|
| 13 | $(C_9H_{19}COO)_2Si(CH_3)_2$ | 0.200 | 50 | none |
| 14 | $(C_{13}H_{27}COO)_3SiCH_3$ | 0.241 | 50 | none |
| 15 | $(C_{17}H_{33}COO)_2Si(CH_3)_2$ | 0.230 | 60 | none |
| 16 | Methylphenylsilicone fluid (viscosity 400 ±50 cS at 25° C, specific gravity 1.06 to 1.08) | 0.482 | 50 | considerable |

The data of Table 3 show that substantially the same results were obtained by coating the magnetic layers with the solution of the organosilicon compounds as in the case where the organosilicon compound was contained in the magnetic layer itself, and that the effectiveness of the organosilicon compound in accordance with the present invention was very remarkable in comparison with the conventional methylphenylsilicone fluid.

While specific examples of the invention have been described, it should be understood that various modifications can be made. For example, the aliphatic group R may have a plurality of double bonds. In addition, two or more of the organosilicon compounds as defined herein can be used in the magnetic layer in combina-

* * * * *